US009225714B2

United States Patent
Le et al.

(10) Patent No.: US 9,225,714 B2
(45) Date of Patent: Dec. 29, 2015

(54) SPATIAL AND TEMPORAL VERIFICATION OF USERS AND/OR USER DEVICES

(71) Applicants: Michael Aaron Le, Silver Spring, MD (US); James Yeager, Ashburn, VA (US)

(72) Inventors: Michael Aaron Le, Silver Spring, MD (US); James Yeager, Ashburn, VA (US)

(73) Assignees: GXM Consulting LLC, Ashburn, VA (US); Michael Aaron Le, Silver Spring, MD (US)

( * ) Notice: Subject to any disclaimer, the term of this patent is extended or adjusted under 35 U.S.C. 154(b) by 135 days.

(21) Appl. No.: 13/909,856

(22) Filed: Jun. 4, 2013

(65) Prior Publication Data
US 2014/0359747 A1   Dec. 4, 2014

(51) Int. Cl.
*H04L 9/32* (2006.01)
*H04L 29/06* (2006.01)
*H04W 12/06* (2009.01)

(52) U.S. Cl.
CPC ........ *H04L 63/0823* (2013.01); *H04L 63/0846* (2013.01); *H04L 63/107* (2013.01); *H04W 12/06* (2013.01); *H04L 9/3263* (2013.01); *H04L 9/3268* (2013.01); *H04L 9/3294* (2013.01); *H04L 63/0807* (2013.01)

(58) Field of Classification Search
CPC ... H04L 9/3294; H04L 9/3263; H04L 9/3268; H04L 63/0807
USPC .............................. 726/5, 6, 10; 713/156–158
See application file for complete search history.

(56) References Cited

U.S. PATENT DOCUMENTS

| | | | |
|---|---|---|---|
| 6,240,530 B1 * | 5/2001 | Togawa | 714/38.13 |
| 6,957,342 B2 | 10/2005 | Vatanen | 713/192 |
| 7,167,677 B2 | 1/2007 | Jung | 455/41.2 |
| 7,882,557 B2 | 2/2011 | Coskun et al. | 726/15 |
| 8,077,689 B1 | 12/2011 | Jones et al. | 370/338 |
| 8,239,934 B2 | 8/2012 | Brown et al. | 726/15 |
| 8,355,672 B2 | 1/2013 | Hinsey | 455/41.2 |
| 2006/0015729 A1 * | 1/2006 | Novack et al. | 713/173 |
| 2006/0259762 A1 * | 11/2006 | Tanimoto | 713/156 |
| 2007/0101420 A1 * | 5/2007 | Masui | 726/10 |
| 2008/0162357 A1 * | 7/2008 | Gerardi et al. | 705/56 |
| 2009/0006846 A1 | 1/2009 | Rosenblatt | 713/159 |
| 2012/0005746 A1 | 1/2012 | Wei et al. | 726/15 |
| 2012/0233674 A1 | 9/2012 | Gladstone et al. | 726/6 |
| 2013/0013925 A1 | 1/2013 | Buer et al. | 713/168 |
| 2013/0046976 A1 | 2/2013 | Rosati et al. | 713/168 |

FOREIGN PATENT DOCUMENTS

| | | | |
|---|---|---|---|
| WO | WO 03007203 A2 * | 1/2003 | |
| WO | WO 2005057846 A1 * | 6/2005 | |
| WO | WO 2014/113882 | 7/2014 | |

* cited by examiner

*Primary Examiner* — Alexander Lagor
(74) *Attorney, Agent, or Firm* — Sheppard Mullin Richter & Hampton LLP

(57) ABSTRACT

Approaches for facilitating spatial and temporal verification of users and/or user devices are disclosed. In some implementations, a user device may be detected within a short wireless communication range. A wireless communication session with the user device may be initiated based on the detection. Information identifying a first integrity-based certificate may be received from the user device during the wireless communication session during a first time period. Information identifying a second integrity-based certificate associated with a second time period may be provided responsive to determining that the first integrity-based certificate is a valid integrity-based certificate associated with the first time period. The second integrity-based certificate may be configured to allow network access for the user device during the second time period.

9 Claims, 8 Drawing Sheets

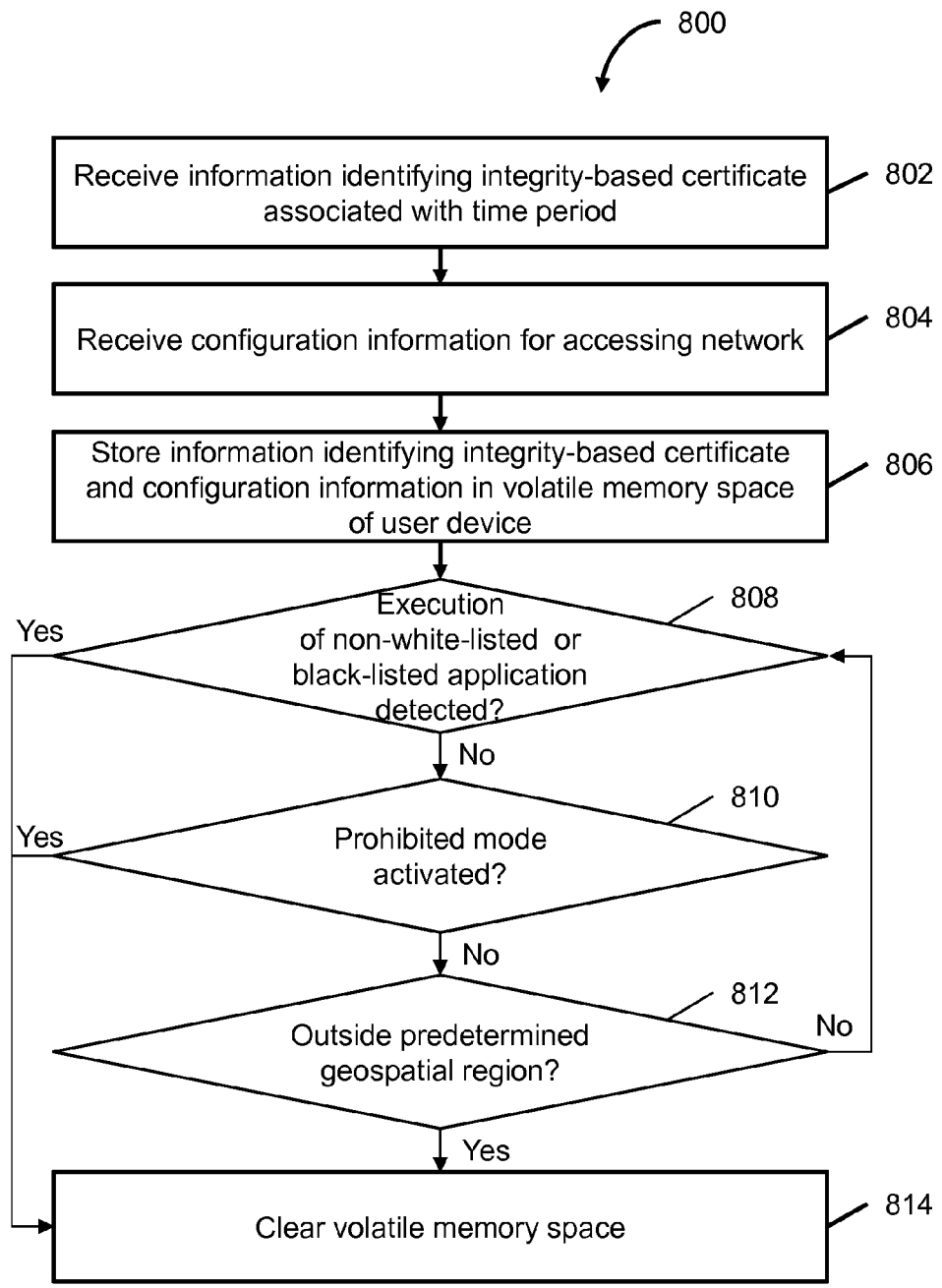

SPATIAL AND TEMPORAL VERIFICATION OF USERS AND/OR USER DEVICES

FIELD OF THE INVENTION

The invention relates generally to verification of users and/or user devices, including, among other verification approaches, spatial and temporal verification.

BACKGROUND OF THE INVENTION

Layered security models used in typical modern communications systems rely heavily on public/private cryptographic key pairs to provide integrity-based certificates that are utilized for verification of users and/or user devices. Nonetheless, while typical integrity-based certificates provide modern communication systems a level of protection from unauthorized access, these communication systems can be compromised when the integrity-based certificates or user devices storing the integrity-based certificates are stolen, obtained, or otherwise accessed by unauthorized entities. These and other drawbacks exists.

SUMMARY OF THE INVENTION

The invention addressing these and other drawbacks relates to methods, apparatuses, and/or systems for spatial and temporal verification of users and/or user devices. In one aspect of the invention, a method may comprise: detecting a user device within a short wireless communication range; initiating a wireless communication session with the user device based on the detection; receiving information identifying a first integrity-based certificate from the user device during the wireless communication session during a first time period; and providing information identifying a second integrity-based certificate associated with a second time period responsive to a determination that the first integrity-based certificate is a valid integrity-based certificate associated with the first time period, wherein the second integrity-based certificate is configured to allow network access for the user device during the second time period.

According to another aspect of the invention, a system may comprise one or more processors configured to: detect a user device within a short wireless communication range; initiate a wireless communication session with the user device based on the detection; receive information identifying a first integrity-based certificate from the user device during the wireless communication session during a first time period; and provide information identifying a second integrity-based certificate associated with a second time period responsive to a determination that the first integrity-based certificate is a valid integrity-based certificate associated with the first time period, wherein the second integrity-based certificate is configured to allow network access for the user device during the second time period.

According to another aspect of the invention, a method may comprise: detecting a certificate device within a short wireless communication range; initiating a wireless communication session with the certificate device based on the detection; transmitting information identifying a first integrity-based certificate to the certificate device during the wireless communication session during a first time period responsive to a determination that the first integrity-based certificate is associated with the first time period, wherein the first integrity-based certificate is configured to allow network access for a user device during the first time period; and receiving information identifying a second integrity-based certificate associated with a second time period from the certificate device responsive to transmitting the information identifying the first integrity-based certificate, wherein the second integrity-based certificate is configured to allow network access for the user device during the second time period.

According to another aspect of the invention, a system may comprise one or more processors configured to: detect a certificate device within a short wireless communication range; initiate a wireless communication session with the certificate device based on the detection; transmit information identifying a first integrity-based certificate to the certificate device during the wireless communication session during a first time period responsive to a determination that the first integrity-based certificate is associated with the first time period, wherein the first integrity-based certificate is configured to allow network access for a user device during the first time period; and receive information identifying a second integrity-based certificate associated with a second time period from the certificate device responsive to transmitting the information identifying the first integrity-based certificate, wherein the second integrity-based certificate is configured to allow network access for the user device during the second time period.

These and other features of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The invention is illustrated by way of example, and not by way of limitation, in the figures of the accompanying drawing and in which like reference numerals refer to similar elements.

FIG. 8 illustrates a flowchart of processing operations for preventing unauthorized entities from obtaining certificate information and/or other sensitive information, in accordance with one or more implementations.

DETAILED DESCRIPTION OF THE INVENTION

In the following description, for the purposes of explanation, numerous specific details are set forth in order to provide a thorough understanding of the implementations of the invention. It will be appreciated, however, by one skilled in the art that the implementations of the invention may be practiced without these specific details or with an equivalent arrangement. In other instances, well-known structures and devices are shown in block diagram form in order to avoid unnecessarily obscuring the implementations of the invention.

Figure 1:
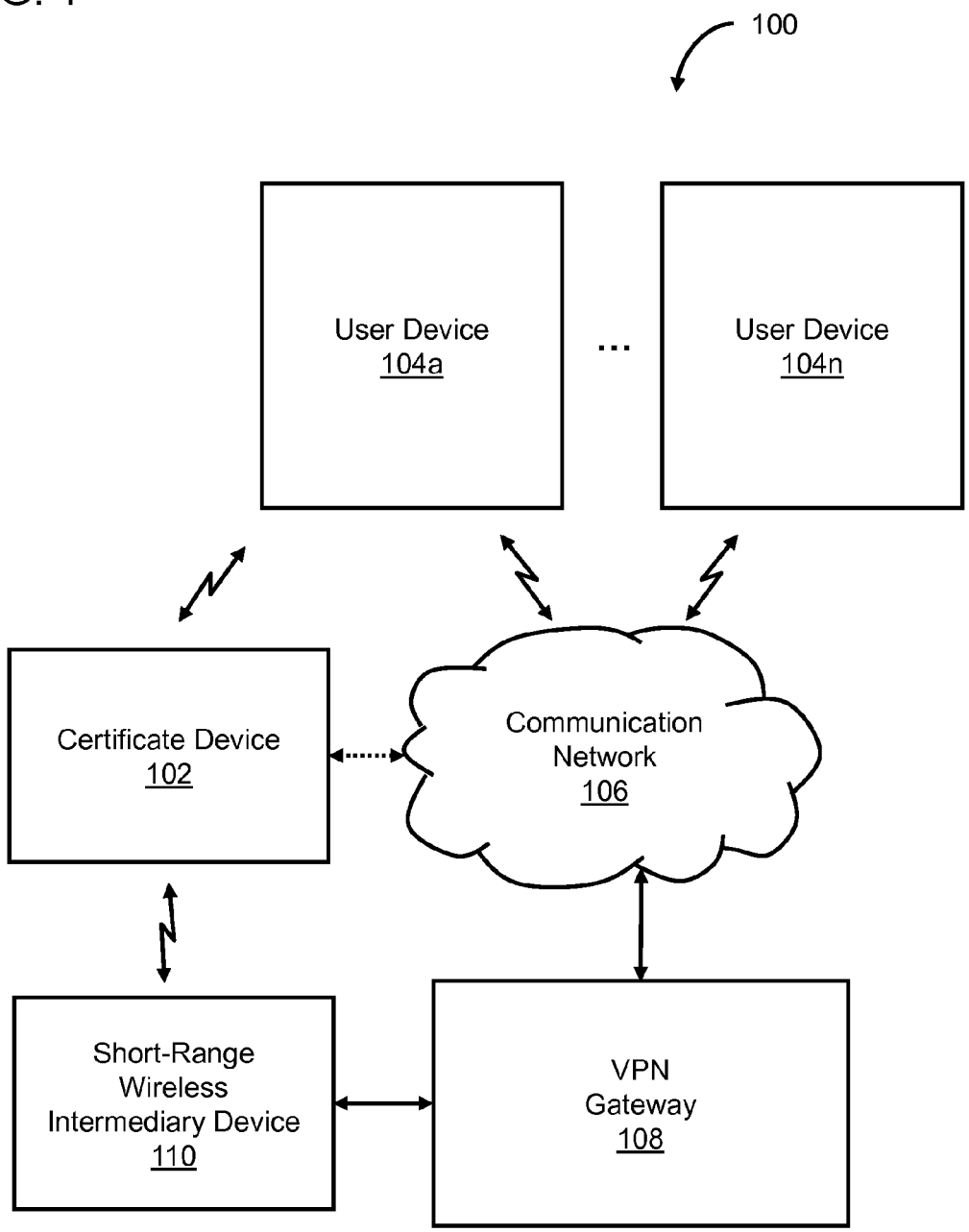
FIG. 1 illustrates a diagram of a system for spatial and temporal verification of users and/or user devices, in accordance with one or more implementations.

FIG. 1 illustrates a diagram of a system 100 for spatial and temporal verification of users and/or user devices, in accordance with one or more implementations. By way of example, system 100 may comprise a certificate device 102, a user device 104 (or multiple user devices 104a-104n), a communication network 106, a virtual private network (VPN) gateway 108, a short-range wireless intermediary device 110, or other components.

Certificate device 102 may comprise any type of mobile terminal, fixed terminal, and/or other device configured to provide certificates that allow network access for one or more user devices 104. In some implementations, certificate device 102 may provide integrity-based certificates on behalf of a plurality of networks. In one or more implementations, a plurality of certificate devices 102 may provide certificates that allow network access on behalf of a single network.

User device 104 may comprise any type of mobile terminal, fixed terminal, and/or other device. For example, user device 104 may comprise a desktop computer, a notebook computer, a netbook computer, a tablet computer, a smartphone, a navigation device, an electronic book device, a gaming device, and/or any other user device. Users may, for instance, utilize one or more user devices 104 to interact with certificate device 102, communication network 106, VPN gateway 108, or other components of system 100. In some implementations, user device 104 may comprise the accessories and peripherals of these devices. User device 104 may also support any type of interface to the user (such as "wearable" circuitry, etc.).

Communication network 106 of system 100 may comprise one or more networks such as a data network, a wireless network, a telephony network, and/or other communication networks. A data network may comprise any local area network (LAN), metropolitan area network (MAN), wide area network (WAN), a public data network (e.g., the Internet), short range wireless network, and/or any other suitable packet-switched network. The wireless network may, for example, comprise a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium (e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), etc.).

VPN gateway 108 may comprise one or more devices configured to interface with one or more virtual private networks, control access to resources of the one or more virtual private networks, or perform other gateway operations.

Short-range wireless intermediary device 110 may comprise any type of mobile terminal, fixed terminal, and/or other device configured to communicate via short-range wireless protocols. In some implementations, short-range wireless intermediary device 110 may act as an intermediary between certificate device 102 and a network associated with VPN gateway 108, as described in further detail below.

In one or more implementations, access to a particular network by a user of user device 104 may require that user device 104 provide a valid integrity-based certificate along with other information (e.g., user credentials of the user that correspond to an account of the user, a device identifier of user device 104, etc.). An integrity-based certificate may, for instance, include a message authentication code (MAC), a public key signature, or other integrity-based code. The integrity-based certificate may be valid for a certain period of time (e.g., until an expiration date/time associated with the certificate, between a start time and an end time, or other time period) such that user device 104 may need an updated integrity-based certificate to access the network after the certain time period. It should be noted that references herein to an updated integrity-based certificate may refer to a new or updated integrity-based certificate.

In some implementations, a certificate device 102 associated with the network may be utilized to provide an updated integrity-based certificate to user device 104 when user device 104 physically "checks-in" and provides a valid integrity-based certificate for accessing the network. By way of example, certificate device 102 may comprise a short-range wireless device, such as a Bluetooth device, a near field communication (NFC) device, or other short-range wireless device. A user may "check-in" user device 104 with certificate device 102 by bringing user device 104 within a short wireless communication range of certificate device 102 to initiate a wireless communication session through which integrity-based certificates may be exchanged. User device 104 may, for example, transmit the integrity-based certificate that is valid for a certain time period to certificate device 102 during the wireless communication session in exchange for an updated integrity-based certificate that remains valid for accessing the network after the certain time period. In this way, among other benefits, system 100 may provide both spatial and temporal safeguards against unauthorized access to a network.

In certain implementations, certificate device 102 may detect user device 104 within a short wireless communication range of certificate device 102. Based on the detection, certificate device 102 may initiate a wireless communication session with user device 104. Certificate device 102 may receive information identifying a first integrity-based certificate from user device 104 during the wireless communication session during a first time period. Responsive to determining that the first integrity-based certificate is a valid integrity-based certificate associated with the first time period, certificate device 102 may provide information identifying a second integrity-based certificate associated with a second time period. The first integrity-based certificate may be configured to allow network access for user device 104 during the first time period. The second integrity-based certificate may be configured to allow network access for user device 104 during the second time period. As used herein, information identifying an integrity-based certificate may comprise the integrity-based certificate, a representation of the integrity-based certificate (e.g., graphical representation, audio representation, haptic representation, etc.), or other information identifying the integrity-based certificate.

Figure 2:
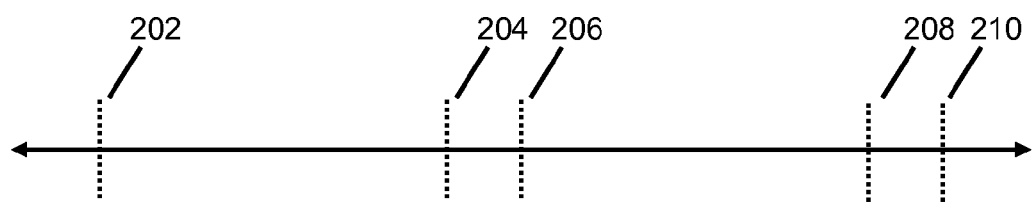
FIG. 2 illustrates an exemplary diagram of times that correspond to time periods utilized for spatial and temporal verification of users and/or user devices, in accordance with one or more implementations.

FIG. 2 illustrates an exemplary diagram of times that correspond to time periods utilized for spatial and temporal verification of users and/or user devices, in accordance with one or more implementations. As shown, the diagram of times include times 202, 204, 206, 208, and 210. In one scenario, a user device may have a first integrity-based certificate that was generated at time 202, and is set to expire at time 206. The first integrity-based certificate may, for instance, comprise a valid integrity-based certificate for a particular network from the time of generation (e.g., time 202) until the time of expiration (e.g., time 206). If a certificate device that is configured to provide integrity-based certificates for accessing the network receives the first integrity-based certificate from the user device before the first integrity-based certificate expires at time 206, the certificate device may transmit an updated integrity-based certificate (e.g., a second integrity-based certificate) to the user device that allows the user device to access the network even after the first integrity-based certificate expires at time 206. The updated certificate may, for instance, be generated by the certificate device at time 204, and be set to expire at time 208 in response to receiving the first integrity-based certificate and determining that the first integrity-based certificate was a valid integrity-based certificate at the time of receipt. After the user device receives the updated integrity-based certificate, the user device may utilize the updated integrity-based certificate (e.g., the second integrity-based certificate) to access the network in lieu of the first integrity-based certificate.

In another scenario, with respect to FIG. 2, a user device may have a first integrity-based certificate that is valid between time 202 and time 206 for accessing a particular network. If a certificate device that is configured to provide integrity-based certificates for accessing the network receives the first integrity-based certificate from the user device during the time period from time 202 until time 206, the certificate device may transmit an updated integrity-based certificate (e.g., a second integrity-based certificate) to the user device that allows the user to access the network from time 206 until time 210. The certificate device may transmit the updated integrity-based certificate in response to receiving the first integrity-based certificate and determining that the first integrity-based certificate was a valid integrity-based certificate at the time of receipt. The user device may, for instance, utilize the first integrity-based certificate to access the network when the current time of the access is between times 202 and 206. The user device may utilize the updated integrity-based certificate (e.g., the second integrity-based certificate) when the current time of access is between times 206 and 210.

In another scenario, with respect to FIG. 2, a user device may have a first integrity-based certificate that is set to expire at time 206 and is configured to allow network access to a particular network until time 206. Updated integrity-based certificates configured to allow network access to the network beyond time 206 may not be available for transmission to the user device until time 204. As such, if a certificate device that is configured to provide integrity-based certificates for accessing the network receives the first integrity-based certificate from the user device before time 204, the certificate device may not provide an updated integrity-based certificate to the user device. On the other hand, if the certificate device receives the first integrity-based certificate from the user device between times 204 and 206, the certificate device may transmit an updated integrity-based certificate (e.g., a second integrity-based certificate) to the user device that is set to expire at time 210 and that is configured to allow network access to the network until time 210.

With respect to the above scenarios, for example, the user device may replace the first integrity-based certificate with the updated integrity-based certificate (e.g., the second integrity-based certificate) responsive to receiving the updated integrity-based certificate such that the user device may utilize the updated integrity-based certificate to access the network even if the first integrity-based certificate has not yet expired. In another example, even after receiving the updated integrity-based certificate, the user device may continue to utilize the first integrity-based certificate until the first integrity-based certificate expires. The user device may then utilize the updated integrity-based certificate after the first integrity-based certificate expires.

In another scenario, with respect to FIG. 2, a user device may have a first integrity-based certificate that was generated at time 202 and set to expire at time 206. If a certificate device that is configured to provide integrity-based certificates for accessing the network receives the first integrity-based certificate from the user device before the first integrity-based certificate expires at time 206, the certificate device may present a Quick Response (QR) Code representing an updated integrity-based certificate (e.g., a second integrity-based certificate) on a display of the certificate device. A camera or other capturing device of the user device may be utilized to capture the QR Code, and an application on the user device may determine the updated integrity-based certificate based on the captured QR Code. The updated integrity-based certificate may, for instance, allow the user device to access the network even after the first integrity-based certificate expires at time 206.

In some implementations, certificate device 102 may generate the information identifying the second integrity-based certificate for user device 104 responsive to a determination that the first integrity-based certificate (identified by the information received from user device 104) is a valid integrity-based certificate associated with the first time period. In one or more implementations, certificate device 102 may provide the generated information identifying the second integrity-based certificate by presenting a graphical representation of the generated information on a display of certificate device 102, transmitting the generated information to user device 104 during the wireless communication session (initiated based on the detection of user device 104 by certificate device 102), or via other means of dissemination.

By way of example, with respect to FIG. 2, a certificate device that is configured to generate integrity-based certificates for accessing a particular network may generate unique integrity-based certificates for user devices that initiate requests for integrity-based certificates. In one use case, for example, the certificate device may receive multiple certificate requests from different user devices. In response to the multiple certificate requests, the certificate device may generate and transmit a unique integrity-based certificate to each of the different user devices such that each of the different user devices is provided with an integrity-based certificate that is different from integrity-based certificates provided to other ones of the different user devices.

In various implementations, certificate device 102 may provide configuration information identifying a host identifier, a port identifier, a network address, or other configuration information associated with a network for which the second integrity-based certificate (identified by the information transmitted to user device 104) is configured to allow network access. Certificate device 102 may, for example, provide the configuration information to user device 104 responsive to a determination that the first integrity-based certificate (identified by the information received from user device 104) is a valid integrity-based certificate associated with the first time period.

In one or more implementations, certificate device 102 may provide the configuration information by transmitting the configuration information to user device 104 during the wireless communication session (initiated based on the detection of user device 104 within the short wireless communication range of certificate device 102). In one scenario, when a user device "checks-in" with a certificate device and provides an unexpired integrity-based certificate configured to allow network access for the user device, the certificate device may transmit to the user device an updated integrity-based certificate along with a network address (e.g., domain.com:[port-#], [network-IP-#]:[port-#], etc.) that the user device may use to initiate the request for network access to a network corresponding to the network address.

In another scenario, the current (and unexpired) integrity-based certificate may be configured to allow network access to a network when a first network address associated with the current integrity-based certificate is used to initiate a connection to the network. On the other hand, the updated integrity-based certificate may be configured to allow network access to the network when a second network address associated with the updated integrity-based certificate is used to initiate a connection to the network. The first network address may, for example, be different than the second network address. In this way, among other benefits, even if unauthorized entities were to obtain a valid integrity-based certificate configured to allow network access to a network, the unauthorized entities may not have the configuration information needed to initiate a connection to the network to request the network access.

In some implementations, certificate device 102 may provide the information identifying the second integrity-based certificate (associated with the second time period), the configuration information, or other information by presenting a graphical representation of the information identifying the second integrity-based certificate, the configuration information, or the other information on a display. In one use case, when a user device "checks-in" with a certificate device and provides an unexpired integrity-based certificate configured to allow network access for the user device, the certificate device may present a Quick Response (QR) Code on a display of the certificate device. The presented QR code may represent an updated integrity-based certificate and a network address (e.g., domain.com:[port-#], [network-IP-#]:[port-#], etc.) that the user device may use to initiate the request for network access to a network corresponding to the network address. The presented QR Code may be captured by a camera or other capturing device of the user device, and analyzed by an application on the user device to determine the updated integrity-based certificate and the network address.

In certain implementations, certificate device 102 may determine not to provide the information identifying the second integrity-based certificate (associated with the second time period) to user device 104. Certificate device 102 may, for example, determine not to provide the information identifying the second integrity-based certificate to user device 104 responsive to a determination that the first integrity-based certificate (identified by the information received from user device 104) is not a valid integrity-based certificate associated with the first time period. By way of example, with respect to FIG. 2, the first integrity-based certificate may be generated at time 202 and have an expiration date/time at time 206 such that the first time period is from time 202 to time 206. If, for instance, a certificate device receives the first integrity-based certificate from a user device after time 206 as part of a request for an updated integrity-based certificate, the certificate device may determine that the first integrity-based certificate has expired and is no longer valid. As such, the certificate device may determine not to generate an updated integrity-based certificate (e.g., the second integrity-based certificate) for the user device.

In one or more implementations, certificate device 102 may generate and/or provide the information identifying the second integrity-based certificate (associated with the second time period) for user device 104 responsive to a determination that the information identifying the first integrity-based certificate is received from user device 104 within the first time period or within a predetermined time period after the first time period. By way of example, with respect to FIG. 2, the first integrity-based certificate may be generated at time 202 and have an expiration date/time at time 204 such that the first time period is from time 202 to time 204. If, for instance, a certificate device receives the first integrity-based certificate from a user device after time 204 as part of a request for an updated integrity-based certificate, the certificate device may determine that the first integrity-based certificate has expired. Nonetheless, if the first integrity-based certificate is received by the certificate device on or before time 206 (e.g., on or before the end of the predetermined time period after the first time period), the certificate device may generate and/or provide an updated integrity-based certificate for the user device. In this way, for example, user devices may have a "safe haven" period to obtain an updated integrity-based certificate even after their current integrity-based certificates are expired or otherwise cannot be used to obtain network access to a network.

In some implementations, certificate device 102 may generate a notification that is directed to an administrator and that indicates a request for a valid integrity-based certificate. The generation of the notification may, for example, be responsive to a determination by certificate device 102 that the first integrity-based certificate (identified by the information received from user device 104) is not a valid integrity-based certificate associated with the first time period. In one or more implementations, certificate device 102 may provide the information identifying the second integrity-based certificate (associated with a second time period) responsive to a determination that the administrator has approved the request for a valid integrity-based certificate.

In one use case, for instance, a user device that does not "check-in" with a certificate device in time to provide an integrity-based certificate (e.g., the integrity-based certificate has expired, a "safe haven" period has passed, etc.) may need a system administrator to approve a request for an updated integrity-based certificate. The system administrator may, for example, be required to review the request and the network for potential security risks, and to attest to the state of the device, before the request for an updated integrity-based certificate can be approved. Upon approval, the certificate device may generate an updated integrity-based certificate for the user device. In another use case, a user device that does not have an integrity-based certificate may need the system administrator to approve a request for an integrity-based certificate before an integrity-based certificate may be generated by the certificate device for the user device.

In various implementations, certificate device 102 may transmit the information identifying the second integrity-based certificate (associated with the second time period) to short-range wireless intermediary device 110. Short-range wireless intermediary device 110 may be associated with a network for which the second integrity-based is configured to allow network access. Certificate device 102 may, for example, transmit the information identifying the second integrity-based certificate to short-range wireless intermediary device 110 responsive to a determination that the first integrity-based certificate (identified by the information received from user device 104) is a valid integrity-based certificate associated with the first time period. In one or more implementations, certificate device 102 may transmit the information identifying the second integrity-based certificate to short-range wireless intermediary device 110 to cause short-range wireless intermediary device 110 to transmit the information identifying the second integrity-based certificate to the network.

By way of example, certificate device 102 may comprise a stand-alone key or certificate server that communicates via Bluetooth. Upon establishing a Bluetooth communication session with user device 104 and determining to provide user device with an updated integrity-based certificate (e.g., the second integrity-based certificate), certificate device 102 may transmit the updated integrity-based certificate to user device 104 via the Bluetooth communication session with user device 104 and transmit the updated integrity-based certificate to short-range wireless intermediary device 110 via another Bluetooth communication session with short-range wireless intermediary device 110. Upon receiving the updated integrity-based certificate, short-range wireless intermediary device 110 may transmit the updated integrity-based certificate to VPN gateway 108 corresponding to the network. As such, when VPN gateway 108 receives requests from one or more user devices for network access to the network, VPN gateway 108 may perform verification of the user devices by comparing integrity-based certificates included in the network access requests based on integrity-based certificates transmitted from certificate device 102 via short-range wireless intermediary device 110.

By way of another example, certificate device 102 may also transmit information identifying one or more integrity-based certificates to be invalidated (e.g., a revocation list) to short-range wireless intermediary device 110. Short-range wireless intermediary device 110 may then transmit the invalidation information to VPN gateway 108. VPN gateway 108 may, for example, utilize the invalidation information to deny a request for network access when integrity-based certificates identified by the invalidation information are utilized in the network access request. In one use case, with respect to FIG. 2, a user device may have a first integrity-based certificate that was generated at time 202, and is set to expire at time 206. If a certificate device receives the first integrity-based certificate from the user device before the first integrity-based certificate expires at time 206, the certificate device may transmit an updated integrity-based certificate (e.g., a second integrity-based certificate) to the user device. The updated certificate may, for instance, be generated by the certificate device at time 204, and be set to expire at time 208. As such, between time 204 and time 206, the user device has two valid integrity-based certificates that can be utilized to access a particular network. To avoid such a situation, for example, the certificate device may identify the first integrity-based certificate (e.g., received from the user device) in a revocation list to revoke the network access that would otherwise be allowed via the first integrity-based certificate. The revocation list may then be provided to the network (e.g., via short-range intermediary device) so that the network can deny a request for network access that utilizes the first integrity-based certificate even when the first integrity-based certificate has not yet expired.

In certain implementations, user device 104 may detect certificate device 102 within a short wireless communication range of user device 104. Based on the detection, user device 104 may initiate a wireless communication session with certificate device 102. User device 104 may transmit a first integrity-based certificate associated with a first time period to certificate device during the wireless communication session during the first time period. The first integrity-based certificate may be configured to allow network access for user device 104 during the first time period. User device 104 may receive information identifying a second integrity-based certificate associated with a second time period from certificate device 102 responsive to transmitting the information identifying the first integrity-based certificate. The second integrity-based certificate may be configured to allow network access for user device 104 during the second time period.

In some implementations, user device 104 may transmit the information identifying the first integrity-based certificate (associated with the first time period) to certificate device 102 during the wireless communication session (initiated based on the detection of certificate device 102 within the short wireless communication range of user device 104) responsive to a determination that the first integrity-based certificate is configured to allow network access of a network to which certificate device 102 corresponds. In one scenario, for example, a user device may store integrity-based certificates that are individually configured to allow network access to different networks. The stored integrity-based certificates may be generated and/or provided by different certificate devices, each of which may correspond to individual ones of the different networks. In order to obtain an updated integrity-based certificate configured to allow network access to a particular network from the certificate device corresponding to the network, the user device may need to provide the certificate device with a current integrity-based certificate configured to allow network access to the network. As such, the user device may select (and provide to the certificate device) the current integrity-based certificate associated with the network from the integrity-based certificates stored on the user device.

In one or more implementations, user device 104 may receive the information identifying the second integrity-based certificate (associated with the second time period) by receiving the information identifying the second integrity-based certificate from certificate device 102 during the wireless communication session responsive to transmitting the information identifying the first integrity-based certificate.

In various implementations, user device 104 may receive configuration information identifying a host identifier, a port identifier, or a network address associated with a network for which the second integrity-based certificate is configured to allow network access, or other configuration information. User device 104 may, for example, receive the configuration information from certificate device 102 responsive to transmitting the information identifying the first integrity-based certificate.

In one or more implementations, user device 104 may receive the information identifying the second integrity-based certificate, the configuration information, or other information by receiving a graphical representation of the information identifying the second integrity-based certificate, the configuration information, or the other information. In one use case, when a user device "checks-in" with a certificate device and provides an unexpired integrity-based certificate configured to allow network access for the user device, the certificate device may present a QR Code on a display of the certificate device. The presented QR code may represent an updated integrity-based certificate and a network address (e.g., domain.com:[port-#], [network-IP-#]:[port-#], etc.) that the user device may use to initiate the request for network access to a network corresponding to the network address. The user device may, for example, capture the presented QR Code, and analyze the presented QR code to determine the updated integrity-based certificate and the network address.

In some implementations, user device 104 may store the information identifying the first integrity-based certificate, the information identifying the second integrity-based certificate, the configuration information, or other information in a volatile memory space of user device 104. In one or more implementations, user device 104 may clear the volatile memory space responsive to a detection of malware on the user device, a deactivation of an anti-malware module of the user device, a determination that certificate device 102 has not been detected within the short wireless communication range of user device 104 during a check-in time period, or other triggers.

By way of example, in one use case, a user device may only store integrity-based certificates, configuration information for initiating a connection to a network for which the integrity-based certificates are configured to allow network access, or other sensitive information in a volatile memory space of the user device. The user device may be integrated with an anti-malware module in conjunction with storage of sensitive information in the volatile memory space to provide a tamper-evidence seal across the user device or other benefits. Upon detection of malware by the anti-malware module, the user device may clear the volatile memory space, resulting in the removal of the sensitive information from the user device. In this way, for instance, the user device 104 may prevent unauthorized entities from obtaining the sensitive information.

In another use case, the user device may clear the volatile memory space upon a deactivation of the anti-malware module. As an example, if the anti-malware module is compromised and turned off by malware on the user device, the user device may proactively clear the volatile memory space to prevent the sensitive information from being obtained by unauthorized entities.

In another use case, the user device may be required to "check-in" with a certificate device on a periodic basis (e.g., hourly, daily, weekly, etc.). A user may facilitate "checking-in" of the user device by bringing the user device close enough to the certificate device such that the certificate device is detected within a short wireless communication range of the user device. For example, if the user device and the certificate device communicate with one another via Bluetooth, the user device may need to be brought within a Bluetooth communication range of both the user device and the certificate device on the periodic basis. If the user device and the certificate communicate with one another via NFC, the user device may need to be brought within an NFC communication range of both the user device and the certificate device on the periodic basis. If, for instance, the certificate device is not detected within the short wireless communication range of the user device during one of the check-in periods, the user device may clear the volatile memory space hosting the sensitive information to prevent unauthorized entities from obtaining the sensitive information. For example, while integrity-based certificates may become invalid when the integrity-based certificates expire (and, thus, may no longer be sensitive information after expiring), clearing of the volatile memory space may still prevent other sensitive information (e.g., configuration information for initiating a connection to a network, user credentials, etc.) from being obtained by unauthorized entities.

In another use case, the user device may be required to stay within a certain geospatial area (e.g., a geospatial area comprising a short wireless communication range of certificate device 102, a geospatial area near an office, home, or other location, etc.). If, for instance, the user device determines that the user device has deviated away from the geospatial area, the user device may clear the volatile memory space hosting the sensitive information.

In certain implementations, user device 104 may transmit the information identifying the second integrity-based certificate to a network for which the second integrity-based certificate is configured to allow network access. In one or more implementations, user device 104 may transmit the information identifying the second integrity-based certificate to the network (e.g., VPN gateway 108 or other gateway). User device 104 may, for example transmit the information identifying the second integrity-based certificate to the network responsive to a determination that a current time is within the second time period. In some implementations, user device 104 may transmit information identifying user credentials of a user to the network. User device 104 may receive network access to the network responsive to transmitting the information identifying the second integrity-based certificate and the information identifying the user credentials. The received network access may be associated with the user.

By way of example, in one scenario, VPN gateway 108 may require that a user device provide both a valid integrity-based certificate (e.g., an unexpired integrity-based certificate that is generated by a certificate device) and valid user credentials of a user having an account on a network for which VPN gateway 108 controls network access. Upon receipt of a valid integrity-based certificate and valid user credentials, VPN gate way 108 may grant network access to the network in accordance with access rights associated with the account of the user.

In some scenarios, the user device may store integrity-based certificates for multiple time periods. Each of the integrity-based certificates may, for example, be valid for different ones of the time periods (e.g., a first time period, a second time period, etc.). As such, the user device may select one of the stored integrity-based certificates to provide to VPN gateway 108 based on the current time.

It is understood that various features (e.g., components, operations, or other features) described herein may be implemented separately or in combination with other features. It should be noted that, although various examples may be described herein with respect to VPN authentication, it is understood that one or more implementations disclosed herein may apply to other verification of users and/or user devices. It should also be noted that, in some implementations, other integrity-based information, such as user device configuration information, system logs, information identifying applications currently executing or previously executing (e.g., within a predetermined period of time), etc., may be utilized in lieu of or in addition to integrity-based certificates to allow network access for a user device.

It should be further noted that, although various examples may be described herein with respect to exchange of information identifying integrity-based certificates, configuration information, or other information using short-range wireless communication technologies, it is understood that such information may be exchanged via other approaches. As an example, certificate device 102 may utilize receive or transmit information identifying integrity-based certificates or other information via wired or wireless communication technologies. As another example, certificate device 102 may utilize a camera or other capturing device to capture graphical representations (e.g., QR Codes or other representations) that are depicted on displays of user devices 104 to obtain information identifying integrity-based certificates or other information from one or more user devices 104.

Figure 3:
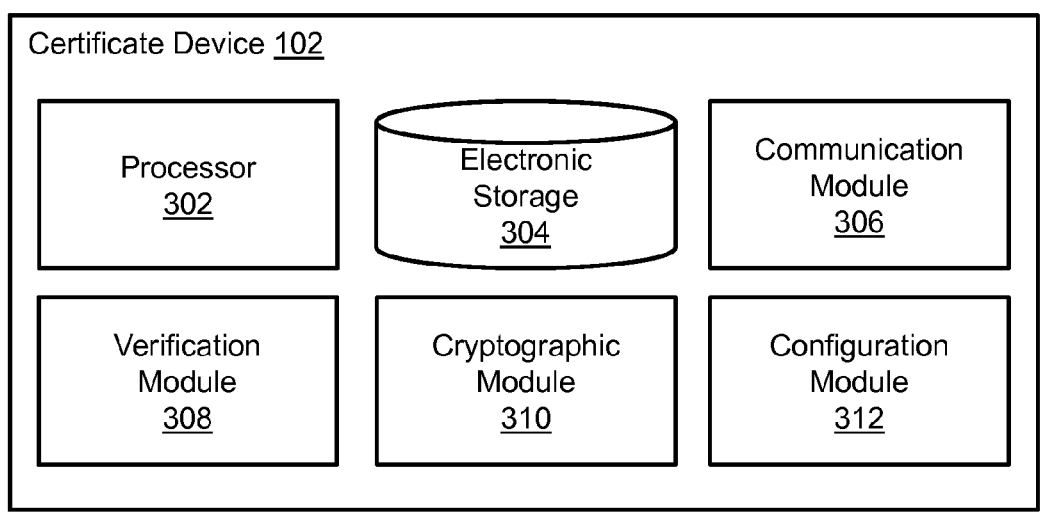
FIG. 3 illustrates a diagram of exemplary components of a certificate device, in accordance with one or more implementations.

FIG. 3 illustrates a diagram of exemplary components of certificate device 102, in accordance with one or more implementations. Certificate device 102 may include at least one processor 302, electronic storage 304, a communication module 306, a verification module 308, a cryptographic module 310, a configuration module 312, or other components (e.g., input/output components, sensors, etc.). Operations of these components may be combined in one or more components or performed by other components of equivalent functionality.

Processor 302 may execute one or more computer program modules to perform one or more operations of certificate device 102. For example, in certain implementations, processor 302 may execute and utilize communication module 306 to facilitate communication with other components of certificate device 102 or devices external to certificate device 102 (e.g., user device 104, VPN gateway 108, short-range wireless intermediary device 110, etc.). In one use case, for instance, communication module 306 may be utilized to work with: (1) one or more sensors of certificate device 102 to detect one or more short-range wireless devices within a short wireless communication range of certificate device 102; (2) one or more input/output components of certificate device 102 to receive or transmit information identifying integrity-based certificates or other information; (3) one or more displays or other output components (e.g., visual, audio, or other types of output components) of certificate device 102 to present representations of information identifying integrity-based certificates or other information; or (4) other components to perform communication operations.

In certain implementations, communication module 306 may detect a user device within a short wireless communication range of certificate device 102. Based on the detection, communication module 306 may initiate a wireless communication session with the user device. Communication module 306 may receive information identifying a first integrity-based certificate from the user device during the wireless communication session during a first time period.

In some implementations, verification module 308 may determine whether the first integrity-based certificate is a valid integrity-based associated with the first time period. Responsive to a determination by verification module 308 that the first integrity-based certificate is a valid integrity-based certificate associated with the first time period, verification module 308 may interact with cryptographic module 310 to generate information identifying a second integrity-based certificate associated with a second time period. The first integrity-based certificate may, for example, be configured to allow network access for the user device during the first time period. The second integrity-based certificate may be configured to allow network access for the user device during the second time period.

In various implementations, responsive to a determination by verification module 308 that the first integrity-based certificate is a valid integrity-based certificate associated with the first time period, verification module 308 may communicate with configuration module 312 to provide configuration information identifying a host identifier, a port identifier, a network address, or other configuration information associated with a network for which the second integrity-based certificate is configured to allow network access.

In certain implementations, communication module 306 may provide the information identifying the second integrity-based certificate and the configuration information by transmitting the information identifying the second integrity-based certificate and the configuration information to the user device during the wireless communication session (initiated based on the detection of the user device within the short wireless communication range of certificate device 102).

In some implementations, communication module 306 may provide the information identifying the second integrity-based certificate and the configuration information by presenting a graphic representation of the information identifying the second integrity-based certificate and the configuration information on a display of certificate device 102. The graphical representation may, for example, be presented on the display of certificate device 102 while the user device is detected within the short wireless communication range of certificate device 102. The user device may obtain the information identifying the second integrity-based certificate and the configuration information by capturing the graphical representation using a camera or other capturing device of the user device and analyzing the graphical representation to determine the information identifying the second integrity-based certificate and the configuration information.

Figure 4:
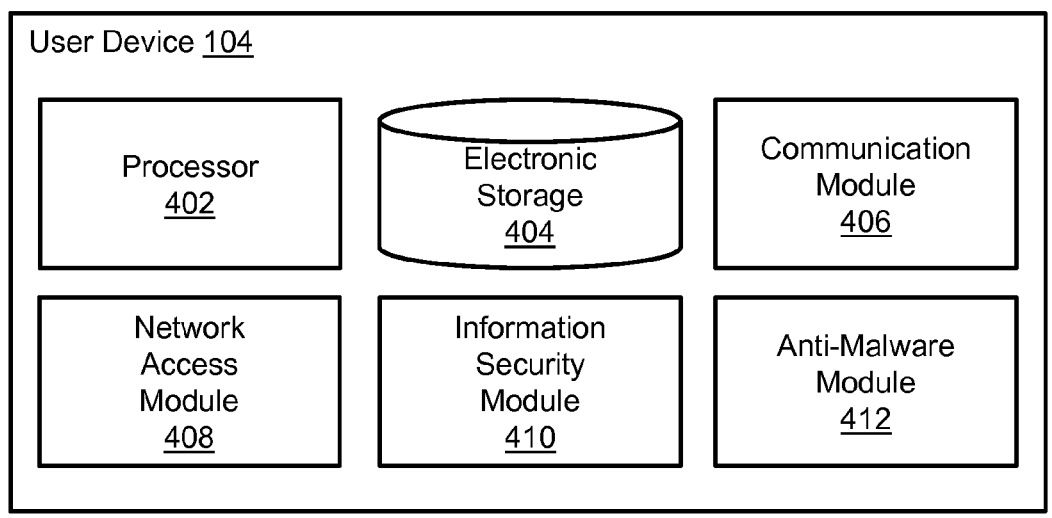
FIG. 4 illustrates a diagram of exemplary components of a user device, in accordance with one or more implementations.

FIG. 4 illustrates a diagram of exemplary components of user device 104, in accordance with one or more implementations. User device 104 may include at least one processor 402, electronic storage 404, a communication module 406, a network access module 408, an information security module 410, an anti-malware module 412, or other components (e.g., input/output components, sensors, etc.). Operations of these components may be combined in one or more components or performed by other components of equivalent functionality.

Processor 402 may execute one or more computer program modules to perform one or more operations of user device 104. For example, in certain implementations, processor 402 may execute and utilize communication module 406 to facilitate communication with other components of user device 104 or devices external to user device 104 (e.g., certificate device 102, VPN gateway 108, etc.). In one use case, for instance, communication module 406 may be utilized to work with: (1) one or more sensors of user device 104 to detect one or more short-range wireless devices within a short wireless communication range of certificate device 102; (2) one or more input/output components of user device 104 to receive or transmit information identifying integrity-based certificates or other information; (3) one or more displays or other output components (e.g., visual, audio, or other types of output components) of user device 104 to present representations of information identifying integrity-based certificates or other information; or (4) other components to perform communication operations.

In various implementations, communication module 406 may detect a certificate device within a short wireless communication range of user device 104. Based on the detection, communication module 406 may initiate a wireless communication session with the certificate device.

In some implementations, network access module 408 may determine information identifying a first integrity-based certificate associated with a first time period. The first integrity-based certificate may be configured to allow network access for user device 104 during the first time period. Network access module 408 may interact with communication module 406 to transmit the information identifying the first integrity-based certificate to the certificate device during the wireless communication session during the first time period.

In certain implementations, responsive to transmitting the information identifying the first integrity-based certificate, communication module 406 may receive information identifying a second integrity-based certificate associated with a second time period from the certificate device. In one or more implementations, responsive to transmitting the information identifying the first integrity-based certificate, communication module 406 may receive configuration information identifying a host identifier, a port identifier, a network address, or other configuration information associated with a network for which the second integrity-based certificate is configured to allow network access.

In some implementations, communication module 406 may receive the information identifying the second integrity-based certificate and the configuration information by receiving the information identifying the second integrity-based certificate and the configuration information from the certificate device during the wireless communication session (initiated based on the detection of the certificate device within the short wireless communication range of user device 104).

In certain implementations, communication module 406 may receive the information identifying the second integrity-based certificate and the configuration information by receiving a graphical representation of the information identifying the second integrity-based certificate and the configuration information.

In some implementations, information security module 410 may store the received information identifying the second integrity-based certificate, the received configuration information, or other information in a volatile memory space of electronic device 404. In one or more implementations, information security module 410 may determine whether the certificate device has been detected within the short wireless communication range of user device 104 during a check-in time period. Responsive to a determination that the certificate device has not been detected within the short wireless communication range of user device 104 during a check-in time period, information security module 410 may clear the volatile memory space. Upon clearing of the volatile memory space, the received information identifying the second integrity-based certificate, the received configuration information, or other information stored in the volatile memory space may no longer reside on user device 104 after the volatile memory space is cleared In various implementations, anti-malware module 412 may monitor for malware on user device 104. Responsive to a detection of malware on user device 104 by anti-malware module 412 or a deactivation of anti-malware module 412, information security module 410 may clear the volatile memory space. The volatile memory space may, for example, be cleared such that the received information identifying the second integrity-based certificate, the received configuration information, or other information stored in the volatile memory space may no longer reside on user device 104.

In certain implementations, information security module 410 may determine whether user device 104 is outside a predetermined geospatial region (e.g., based on the geospatial location of user device 104, proximity of user device 104 from one or more boundary devices, etc.). Responsive to a determination that user device 104 is outside the predetermined geospatial region, information security module 410 may clear the volatile memory space. Thus, in this way, network access for user device 104 may be revoked if user device 104 leaves the predetermined geospatial region.

In one or more implementations, information security module 410 may clear the volatile memory space based on one or more other triggers. As an example, information security module 410 may clear the volatile memory space if a particular mode (e.g., developer mode, administrative mode, etc.) of user device 104 is activated, if non-white-listed programs are executed, if black-listed programs are detected, etc.

In some implementations, network access module 408 may initiate a request for network access to a network for which the second integrity-based certificate is configured to allow network access based on the information identifying the second integrity-based certificate and the configuration information. Network access module 408 may, for example, utilize the configuration information to initiate a connection to the network (e.g., VPN gateway 108 or other gateway). Network access module 408 may utilize the information identifying the second integrity-based certificate and user credentials of a user of user device 104 to provide verification for user device 104 and/or the user.

Figure 5:
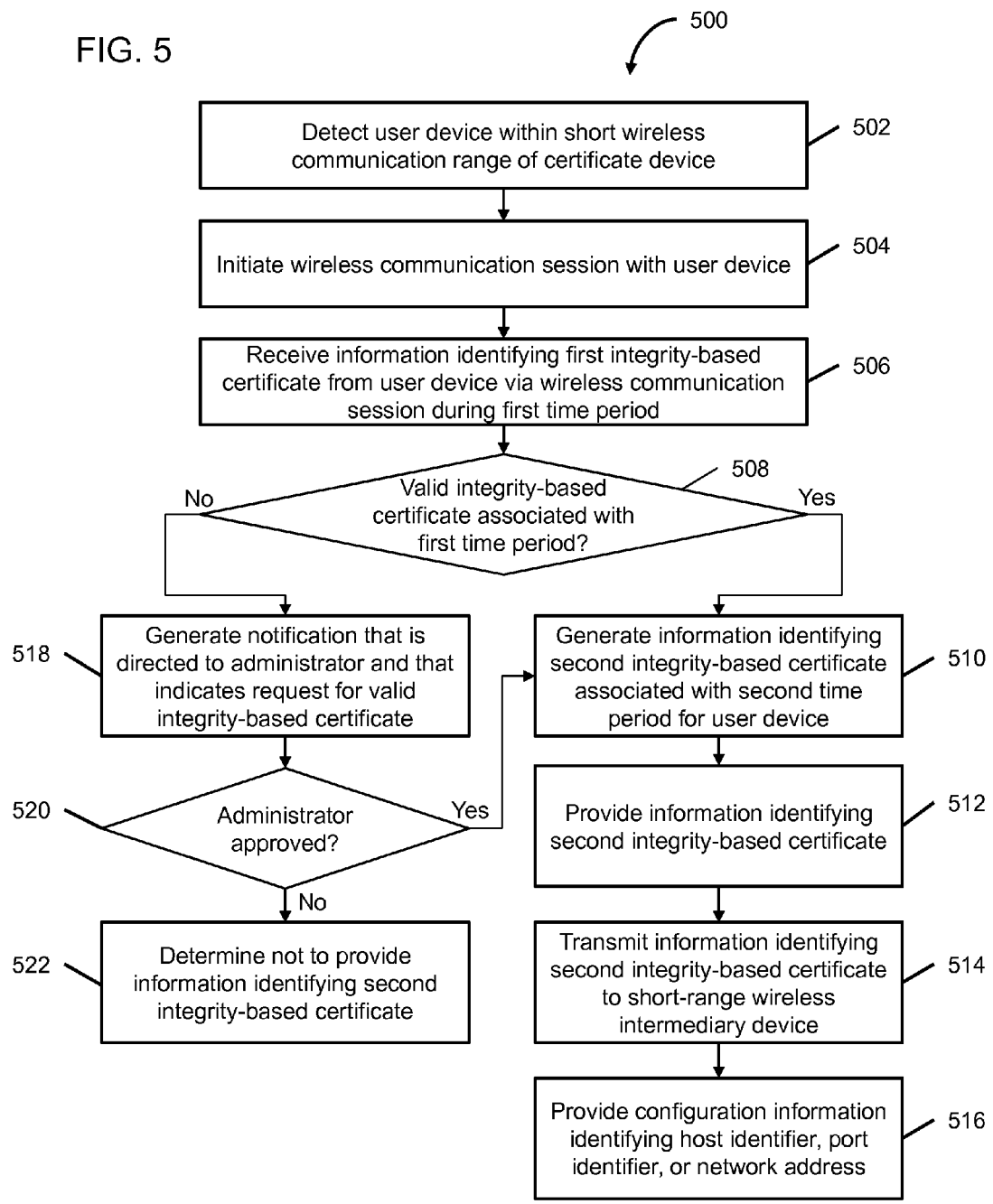
FIG. 5 illustrates a flowchart of processing operations for spatial and temporal verification of users and/or user devices, in accordance with one or more implementations.

FIG. 5 illustrates a flowchart of processing operations for spatial and temporal verification of users and/or user devices, in accordance with one or more implementations. The operations of process 500 presented below are intended to be illustrative. In some implementations, process 500 may be accomplished with one or more additional operations not described, and/or without one or more of the operations discussed. Additionally, the order in which the operations of process 500 are illustrated in FIG. 5 and described below is not intended to be limiting.

In certain implementations, one or more operations of process 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 500 in response to instructions stored electronically on an electronic storage medium. The one or more processing devices may include one or more devices configured through hardware, firmware, and/or software to be specifically designed for execution of one or more of the operations of process 500.

In an operation 502, a user device may be detected within a short wireless communication range of a certificate device. Operation 502 may be performed by a communication module that is the same as or similar to communication module 306, in accordance with one or more implementations.

In an operation 504, a wireless communication session with the detected user device may be initiated. Operation 504 may be performed by a communication module that is the same as or similar to communication module 306, in accordance with one or more implementations.

In an operation 506, information identifying a first integrity-based certificate may be received from the user device during the wireless communication session during a first time period. Operation 506 may be performed by a communication module that is the same as or similar to communication module 306, in accordance with one or more implementations.

In an operation 508, a determination of whether the first integrity-based certificate (that is identified by the received information) is a valid integrity-based certificate associated with the first time period may be effectuated. Operation 508 may be performed by a verification module that is the same as or similar to verification module 308, in accordance with one or more implementations. Responsive to a determination that the first integrity-based certificate is a valid integrity-based certificate associated with the first time period, process 500 may proceed to an operation 510. Responsive to a determination that the first integrity-based certificate is not a valid integrity-based certificate associated with the first time period, process 500 may proceed to an operation 518.

In an operation 510, information identifying a second integrity-based certificate associated with a second time period may be generated for the user device. The second integrity-based certificate may be configured to allow network access for the user device during the second time period. Operation 510 may be performed by a cryptographic module that is the same as or similar to cryptographic module 310, in accordance with one or more implementations.

In an operation 512, the generated information identifying the second integrity-based certificate may be provided. In certain implementations, the generated information identifying the second integrity-based certificate may be provided by transmitting the generated information identifying the second integrity-based certificate to the user device during the wireless communication session (initiated based on the detection of the user device within the short wireless communication range). In some implementations, the generated information identifying the second integrity-based certificate may be provided by presenting a graphical representation of the information identifying the second integrity-based certificate on a display. Operation 512 may be performed by a communication module that is the same as or similar to communication module 306, in accordance with one or more implementations.

In an operation 514, the generated information identifying the second integrity-based certificate may be transmitted to a short-range wireless intermediary device. For example, the transmitted information identifying the second integrity-based certificate may be directed to a network for which the second integrity-based certificate is configured to allow network access such that, responsive to receipt of the information identifying the second integrity-based certificate at the short-range wireless intermediary device, the short-range wireless intermediary device may transmit the information identifying the second integrity-based certificate to the network. Operation 514 may be performed by a communication module that is the same as or similar to communication module 306, in accordance with one or more implementations.

In an operation 516, configuration information identifying a host identifier, a port identifier, a network address, or other configuration information associated with a network for which the second integrity-based certificate is configured to allow network access may be provided. In certain implementations, the configuration information may be provided by transmitting the configuration information to the user device during the wireless communication session (initiated based on the detection of the user device within the short wireless communication range). In some implementations, the configuration information may be provided by presenting a graphical representation of the configuration information on a display. In one or more implementations, the information identifying the second integrity-based certificate and the configuration information may be provided by presenting a graphical representation of the information identifying the second integrity-based certificate and the configuration information on a display. Operation 516 may be performed by a communication module and/or a configuration module that are the same as or similar to communication module 306 and/or configuration module 312, in accordance with one or more implementations.

Responsive to a determination in operation 508 that the first integrity-based certificate (identified in the received information) is not a valid integrity-based certificate associated with the first time period, process 500 may proceed to operation 518. In operation 518, a notification that is directed to an administrator and that indicates a request for a valid integrity-based certificate may be generated. Operation 518 may be performed by a verification module that is the same as or similar to verification module 308, in accordance with one or more implementations.

In an operation 520, a determination of whether the administrator has approved the request for a valid integrity-based certificate may be effectuated. Operation 520 may be performed by a verification module that is the same as or similar to verification module 308, in accordance with one or more implementations. Responsive to a determination that the administrator has approved the request for a valid integrity-based certificate, process 500 may proceed to operation 510.

Responsive to a determination that the request for a valid integrity-based certificate has been declined or otherwise not approved by the administrator, process 500 may proceed to an operation 522. In operation 522, a determination not to provide the information identifying the second integrity-based certificate may be effectuated. Operation 522 may be performed by a verification module that is the same as or similar to verification module 308, in accordance with one or more implementations.

Figure 6:
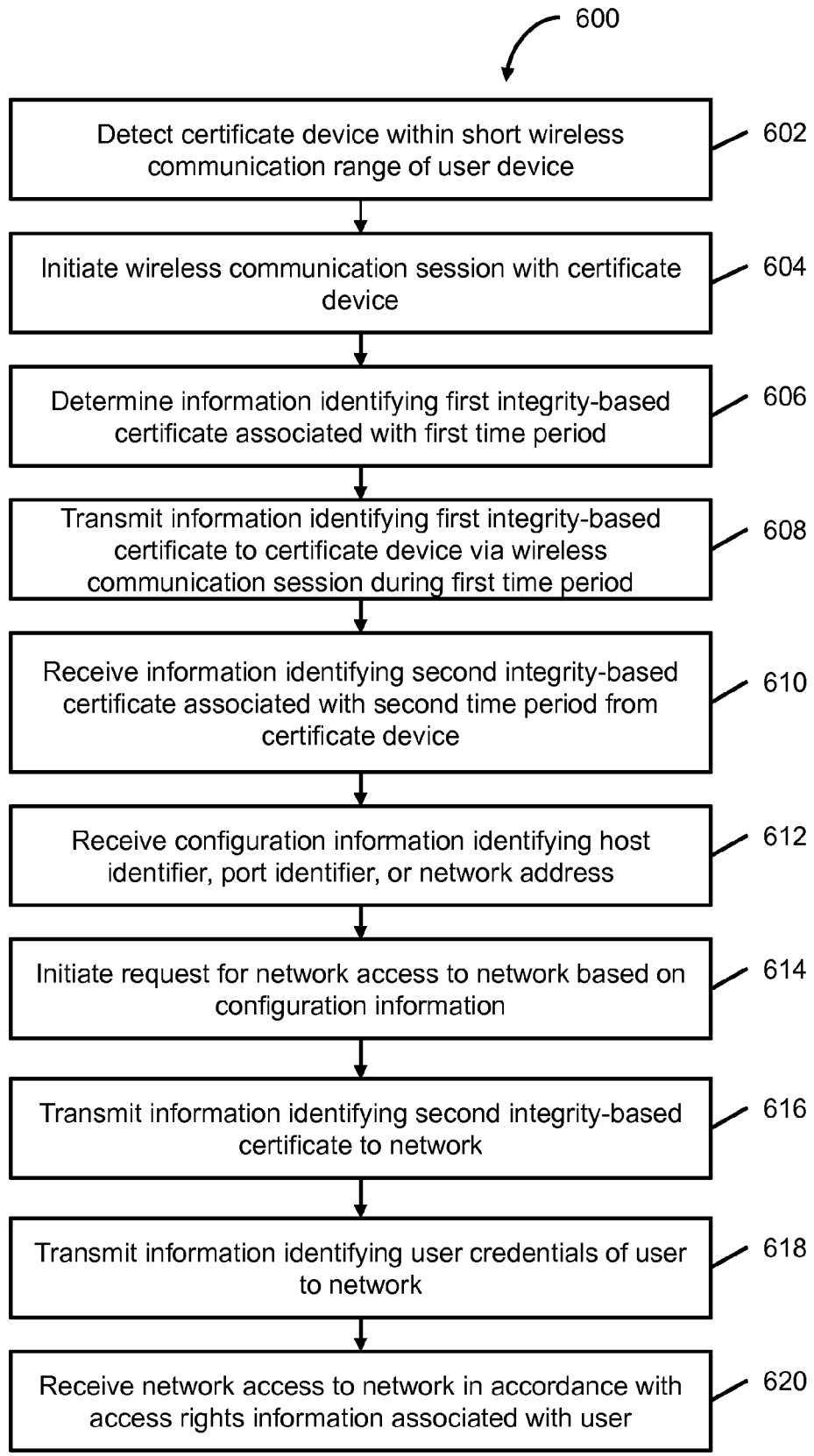
FIG. 6 illustrates a flowchart of processing operations for spatial and temporal verification of users and/or user devices, in accordance with one or more implementations.

FIG. 6 illustrates a flowchart of processing operations for spatial and temporal verification of users and/or user devices, in accordance with one or more implementations. The operations of process 600 presented below are intended to be illustrative. In some implementations, process 600 may be accomplished with one or more additional operations not described, and/or without one or more of the operations discussed. Additionally, the order in which the operations of process 600 are illustrated in FIG. 6 and described below is not intended to be limiting.

In certain implementations, one or more operations of process 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 600 in response to instructions stored electronically on an electronic storage medium. The one or more processing devices may include one or more devices configured through hardware, firmware, and/or software to be specifically designed for execution of one or more of the operations of process 600.

In an operation 602, a certificate device may be detected within a short wireless communication range of a user device. Operation 602 may be performed by a communication module that is the same as or similar to communication module 406, in accordance with one or more implementations.

In an operation 604, a wireless communication session with the detected certificate device may be initiated. Operation 604 may be performed by a communication module that is the same as or similar to communication module 406, in accordance with one or more implementations.

In an operation 606, information identifying a first integrity-based certificate associated with a first time period may be determined. The first integrity-based certificate (identified by the determined information) may be configured to allow network access for a user device during the first time period. Operation 606 may be performed by a network access module that is the same as or similar to network access module 408, in accordance with one or more implementations.

In an operation 608, the determined information identifying the first integrity-based certificate may be transmitted to the certificate device during the wireless communication session during the first time period. Operation 608 may be performed by a communication module that is the same as or similar to communication module 406, in accordance with one or more implementations.

In an operation 610, information identifying a second integrity-based certificate associated with a second time period may be received from the certificate device. As indicated, the information identifying the second integrity-based certificate may be received responsive to transmitting the information identifying the first integrity-based certificate. In certain implementations, the information identifying the second integrity-based certificate may be received by receiving the information identifying the second integrity-based certificate from the certificate device during the wireless communication session (initiated based on the detection of the certificate device within the short wireless communication range). In some implementations, the information identifying the second integrity-based certificate may be received by receiving a graphical representation of the information identifying the second integrity-based certificate. Operation 610 may be performed by a communication module that is the same as or similar to communication module 406, in accordance with one or more implementations.

In an operation 612, configuration information identifying a host identifier, a port identifier, a network address, or other configuration information associated with a network for which the second integrity-based certificate is configured to allow network access may be received from the certificate device. In certain implementations, the configuration information may be received from the certificate device during the wireless communication session responsive to transmitting the information identifying the first integrity-based certificate. In some implementations, the configuration information may be received by receiving a graphical representation of the configuration information. In one or more implementations, the information identifying the second integrity-based certificate and the configuration information may be received by receiving a graphical representation of the information identifying the second integrity-based certificate and the configuration information. Operation 612 may be performed by a communication module that is the same as or similar to communication module 406, in accordance with one or more implementations.

In an operation 614, a request for network access to the network (for which the second integrity-based certificate is configured) may be initiated based on the received configuration information. Operation 614 may be performed by a network access module that is the same as or similar to network access module 408, in accordance with one or more implementations.

In an operation 616, the information identifying the second integrity-based certificate may be transmitted to the network. For example, the information identifying the second integrity-based certificate may be transmitted to the network as part of the request for network access. Operation 616 may be performed by a communication module that is the same as or similar to communication module 406, in accordance with one or more implementations.

In an operation 618, information identifying user credentials of a user may be transmitted to the network. For example, the information identifying the user credentials of the user may be transmitted to the network as part of the request for network access. Operation 618 may be performed by a communication module that is the same as or similar to communication module 406, in accordance with one or more implementations.

In an operation 620, network access to the network may be received. For example, the network access to the network may be received responsive to transmitting the information identifying the second integrity-based certificate and the user credentials of the user. The received network access to the network may be in accordance with access rights information associated with the user. Operation 620 may be performed by a communication module that is the same as or similar to communication module 406, in accordance with one or more implementations.

Figure 7:
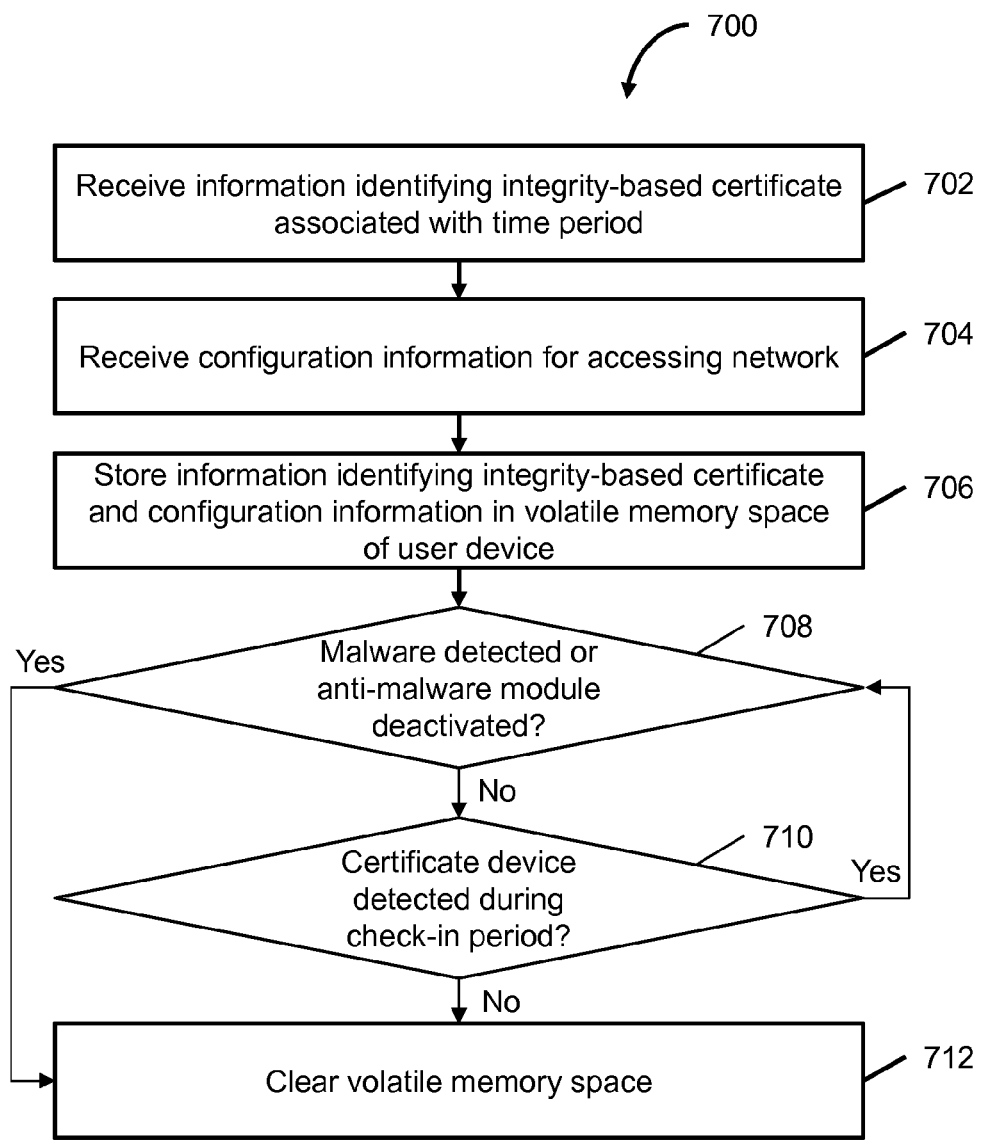
FIG. 7 illustrates a flowchart of processing operations for preventing unauthorized entities from obtaining certificate information and/or other sensitive information, in accordance with one or more implementations.

FIG. 7 illustrates a flowchart of processing operations for preventing unauthorized entities from obtaining certificate information and/or other sensitive information, in accordance with one or more implementations. The operations of process 700 presented below are intended to be illustrative. In some implementations, process 700 may be accomplished with one or more additional operations not described, and/or without one or more of the operations discussed. Additionally, the order in which the operations of process 700 are illustrated in FIG. 7 and described below is not intended to be limiting.

In certain implementations, one or more operations of process 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 700 in response to instructions stored electronically on an electronic storage medium. The one or more processing devices may include one or more devices configured through hardware, firmware, and/or software to be specifically designed for execution of one or more of the operations of process 700.

In an operation 702, information identifying an integrity-based certificate associated with a time period may be received. As indicated, the integrity-based certificate associated with a time period may comprise a first integrity-based certificate associated with a first time period, a second integrity-based certificate associated with a second time period, or other integrity-based certificate. The integrity-based certificate may be configured to allow network access for a user device (e.g., at which the information identifying the integrity-based certificate is received). Operation 702 may be performed by a communication module that is the same as or similar to communication module 406, in accordance with one or more implementations.

In an operation 704, configuration information identifying a host identifier, a port identifier, a network address, or other configuration information for initiating a request to a network may be received. For example, the network corresponding to the received configuration information may comprise a network for which the received integrity-based certificate is configured to allow network access. Operation 704 may be performed by a communication module that is the same as or similar to communication module 406, in accordance with one or more implementations.

In an operation 706, the information identifying the integrity-based certificate and the configuration information may be stored in a volatile memory space of the user device (e.g., at which the information identifying the integrity-based certificate and the configuration information is received). Operation 706 may be performed by an information security module that is the same as or similar to information security module 410, in accordance with one or more implementations.

In an operation 708, a determination of whether a malware has been detected on the user device or whether an anti-malware module of the user device has been deactivated may be effectuated. Operation 708 may be performed by an information security module and/or an anti-malware module that are the same as or similar to information security module 410 and/or anti-malware module 412, in accordance with one or more implementations. Responsive to a determination that malware has not been detected on the user device and that the anti-malware module has not been deactivated, process 700 may proceed to an operation 710. Responsive to a determination that malware has been detected on the user device or that the anti-malware module has been deactivated, process 700 may proceed to an operation 712.

In an operation 710, a determination of whether the certificate device has been detected within a short wireless communication range during a check-in time period may be effectuated. For example, the determination of whether the certificate device has been detected within the short wireless communication range may be for the most recent check-in time period. Operation 710 may be performed by an information security module that is the same as or similar to information security module 410, in accordance with one or more implementations. Responsive to a determination that the certificate device has not been detected within the short wireless communication range during the check-in period, process 700 may proceed to operation 712.

In an operation 712, the volatile memory space of the user device may be cleared. For example, the volatile memory space of the user device may be cleared such that the information identifying the integrity-based certificate and the configuration information is no longer available on the user device. Operation 712 may be performed by an information security module that is the same as or similar to information security module 410, in accordance with one or more implementations.

FIG. 8 illustrates a flowchart of processing operations for preventing unauthorized entities from obtaining certificate information and/or other sensitive information, in accordance with one or more implementations. The operations of process 800 presented below are intended to be illustrative. In some implementations, process 800 may be accomplished with one or more additional operations not described, and/or without one or more of the operations discussed. Additionally, the order in which the operations of process 800 are illustrated in FIG. 8 and described below is not intended to be limiting.

In certain implementations, one or more operations of process 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 800 in response to instructions stored electronically on an electronic storage medium. The one or more processing devices may include one or more devices configured through hardware, firmware, and/or software to be specifically designed for execution of one or more of the operations of process 800.

In an operation 802, information identifying an integrity-based certificate associated with a time period may be received. As indicated, the integrity-based certificate associated with a time period may comprise a first integrity-based certificate associated with a first time period, a second integrity-based certificate associated with a second time period, or other integrity-based certificate. The integrity-based certificate may be configured to allow network access for a user device (e.g., at which the information identifying the integrity-based certificate is received). Operation 802 may be performed by a communication module that is the same as or similar to communication module 406, in accordance with one or more implementations.

In an operation 804, configuration information identifying a host identifier, a port identifier, a network address, or other configuration information for initiating a request to a network may be received. For example, the network corresponding to the received configuration information may comprise a network for which the received integrity-based certificate is configured to allow network access. Operation 804 may be performed by a communication module that is the same as or similar to communication module 406, in accordance with one or more implementations.

In an operation 806, the information identifying the integrity-based certificate and the configuration information may be stored in a volatile memory space of the user device (e.g., at which the information identifying the integrity-based certificate and the configuration information is received). Operation 806 may be performed by an information security module that is the same as or similar to information security module 410, in accordance with one or more implementations.

In an operation 808, a determination of whether execution of a non-white-listed or black-listed application has been detected may be effectuated. Operation 808 may be performed by an information security module and/or an anti-malware module that are the same as or similar to information security module 410 and/or anti-malware module 412, in accordance with one or more implementations. Responsive to a determination that execution of a non-white-listed or black-listed application has not been detected, process 800 may proceed to an operation 810. Responsive to a determination that execution of a non-white-listed or black-listed application has been detected, process 800 may proceed to an operation 814.

In an operation 810, a determination of whether a prohibited mode (e.g., developer mode) of the user device has been activated may be effectuated. Operation 810 may be performed by an information security module that is the same as or similar to information security module 410, in accordance with one or more implementations. Responsive to a determination that a prohibited mode (e.g., developer mode) of the user device has not been activated, process 800 may proceed to operation 812. Responsive to a determination that a prohibited mode (e.g., developer mode) of the user device has been activated, process 800 may proceed to operation 814.

In an operation 812, a determination of whether the user device is outside a predetermined geospatial region may be effectuated. Operation 812 may be performed by an information security module that is the same as or similar to information security module 410, in accordance with one or more implementations. Responsive to a determination that the user device is outside the predetermined geospatial region, process 800 may proceed to operation 814.

In an operation 814, the volatile memory space of the user device may be cleared. For example, the volatile memory space of the user device may be cleared such that the information identifying the integrity-based certificate and the configuration information is no longer available on the user device. Operation 814 may be performed by an information security module that is the same as or similar to information security module 410, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A computer-implemented method of facilitating spatial and temporal verification of user devices, the method being implemented by a user device that includes one or more physical processors executing computer program instructions which, when executed, perform the method, the method comprising:
   detecting, by the user device, a certificate device within a short wireless communication range;
   initiating, by the user device, a wireless communication session with the certificate device based on the detection;
   transmitting, by the user device, information identifying a first integrity-based certificate associated with a first time period to the certificate device during the wireless communication session during the first time period, wherein the first integrity-based certificate is configured to allow network access for the user device during the first time period, and the first integrity-based certificate remains valid only until the end of the first time period;
   receiving, at the user device, information identifying a second integrity-based certificate associated with a second time period from the certificate device responsive to transmitting the information identifying the first integrity-based certificate during the first time period, wherein the second integrity-based certificate is configured to allow network access for the user device during the second time period, and the second integrity-based certificate remains valid only until the end of the second time period;
   storing, by the user device, the information identifying the first integrity-based certificate or the information identifying the second integrity-based certificate in a volatile memory space of the user device;
   maintaining, by the user device, the stored information in the volatile memory space until at least the end of a check-in time period responsive to a determination that the certificate device has been detected within the short wireless communication range during at least a portion of the check-in time period; and
   clearing, by the user device, the volatile memory space responsive to a determination that the certificate device has not been detected within the short wireless communication range during the check-in time period.

2. The method of claim 1, wherein transmitting the information identifying the first integrity-based certificate to the certificate device comprises transmitting the information identifying the first integrity-based certificate to the certificate device during the wireless communication session responsive to a determination that the first integrity-based certificate is configured to allow network access of a network to which the certificate device corresponds.

3. The method of claim 1, wherein receiving the information identifying the second integrity-based certificate comprises receiving the information identifying the second integrity-based certificate from the certificate device during the wireless communication session responsive to transmitting the information identifying the first integrity-based certificate.

4. The method of claim 1, further comprising:
   receiving, at the user device, configuration information identifying a host identifier, a port identifier, or a network address associated with a network for which the second integrity-based certificate is configured to allow network access responsive to transmitting the information identifying the first integrity-based certificate.

5. The method of claim 4, wherein receiving the information identifying the second integrity-based certificate and the configuration information comprises receiving a graphic representation of the information identifying the second integrity-based certificate and the configuration information.

6. The method of claim 1, further comprising:
   clearing, by the user device, the volatile memory space responsive to a detection of malware on the user device or a deactivation of an anti-malware module of the user device.

7. The method of claim 1, further comprising:
   transmitting, by the user device, the information identifying the second integrity-based certificate to a network for which the second integrity-based certificate is configured to allow network access responsive to a determination that a current time is within the second time period;
   transmitting, by the user device, information identifying user credentials of a user to the network; and
   receiving, by the user device, network access to the network responsive to transmitting the information identifying the second integrity-based certificate and the information identifying the user credentials, wherein the received network access is associated with the user.

8. A system for facilitating spatial and temporal verification of user devices, the system comprising:
   a user device comprising one or more physical processors programmed to execute computer program instructions which, when executed, cause the one or more physical processors to:
   detect a certificate device within a short wireless communication range;
   initiate a wireless communication session with the certificate device based on the detection;
   transmit information identifying a first integrity-based certificate associated with a first time period to the certificate device during the wireless communication session during the first time period, wherein the first integrity-based certificate is configured to allow network access for the user device during the first time period, and the first integrity-based certificate remains valid only until the end of the first time period;
   receive information identifying a second integrity-based certificate associated with a second time period from the certificate device responsive to transmitting the information identifying the first integrity-based certificate during the first time period, wherein the second integrity-based certificate is configured to allow network access for the user device during the second time period, and the second integrity-based certificate remains valid only until the end of the second time period;
   store the information identifying the first integrity-based certificate or the information identifying the second integrity-based certificate in a volatile memory space of the user device;
   maintain the stored information in the volatile memory space until at least the end of a check-in time period responsive to a determination that the certificate device has been detected within the short wireless communication range during at least a portion of the check-in time period; and
   clear the volatile memory space responsive to a determination that the certificate device has not been detected within the short wireless communication range during the check-in time period.

9. The system of claim 8, wherein the one or more physical processors are further caused to:

clear the volatile memory space responsive to a detection of malware on the user device, or a deactivation of an anti-malware module of the user device.

\* \* \* \* \*